US010713765B2

(12) United States Patent
Partin et al.

(10) Patent No.: US 10,713,765 B2
(45) Date of Patent: Jul. 14, 2020

(54) COLOR IMAGE MODIFICATION WITH APPROXIMATION FUNCTION

(71) Applicant: DOLBY LABORATORIES LICENSING CORPORATION, San Francisco, CA (US)

(72) Inventors: Alexander Partin, Chicago, IL (US); Kimball Darr Thurston, III, Wellington (NZ); Georgios Georgiadis, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/489,662

(22) PCT Filed: Mar. 1, 2018

(86) PCT No.: PCT/US2018/020468
§ 371 (c)(1),
(2) Date: Aug. 28, 2019

(87) PCT Pub. No.: WO2018/160847
PCT Pub. Date: Sep. 7, 2018

(65) Prior Publication Data
US 2020/0043149 A1    Feb. 6, 2020

Related U.S. Application Data

(60) Provisional application No. 62/466,963, filed on Mar. 3, 2017.

(30) Foreign Application Priority Data

Mar. 3, 2017  (EP) .................................... 17159216

(51) Int. Cl.
*G09G 5/02*  (2006.01)
*G06T 5/00*  (2006.01)
(Continued)

(52) U.S. Cl.
CPC ................ *G06T 5/009* (2013.01); *G06T 5/50* (2013.01); *G09G 5/02* (2013.01); *H04N 9/67* (2013.01); *G09G 2340/06* (2013.01)

(58) Field of Classification Search
None
See application file for complete search history.

(56) References Cited

U.S. PATENT DOCUMENTS 8,538,144 B2    9/2013  Benitez
8,593,480 B1 *  11/2013 Ballestad ............. H04N 1/6027
                                                  345/590
(Continued)

FOREIGN PATENT DOCUMENTS

WO    2016118395    7/2016

OTHER PUBLICATIONS

ASC CDL and Avid Workflow, retrieved from Internet, Aug. 12, 2013.
(Continued)

*Primary Examiner* — Aaron M Richer

(57) ABSTRACT

Color trim data is used in an approximation function to approximate one or more non-linear transformations of image data in an image processing pipeline. The color trim data is derived in one embodiment through a back projection on a colorist system, and the color trim data is used at the time of rendering an image on a display management system.

9 Claims, 6 Drawing Sheets

(51) Int. Cl.
*G06T 5/50* (2006.01)
*H04N 9/67* (2006.01)

(56) References Cited

U.S. PATENT DOCUMENTS

| | | |
|---|---|---|
| 8,837,825 B2 | 9/2014 | Su |
| 8,847,976 B2 | 9/2014 | Ollivier |
| 9,077,994 B2 | 7/2015 | Miller |
| 2008/0166043 A1 | 7/2008 | Bassi |
| 2010/0032546 A1* | 2/2010 | Kawano .............. A61B 1/041 250/205 |
| 2010/0158366 A1 | 6/2010 | Brown |
| 2010/0329646 A1 | 12/2010 | Loeffler |
| 2011/0154426 A1 | 6/2011 | Doser |
| 2013/0127856 A1 | 5/2013 | Winnemoeller |
| 2014/0286628 A1 | 9/2014 | Ando |
| 2015/0222792 A1 | 8/2015 | Ogikubo |
| 2016/0005349 A1 | 1/2016 | Atkins |
| 2016/0253792 A1* | 9/2016 | Xu .............. H04N 1/6052 345/590 |
| 2016/0316187 A1 | 10/2016 | Kitajima |
| 2016/0381335 A1 | 12/2016 | Tao |
| 2017/0255849 A1* | 9/2017 | Li .............. G06K 15/1878 |

OTHER PUBLICATIONS

Ebner, F., et al. "Development and testing of a color space (ipt) with improved hue uniformity" 6th Color Imaging Conference, Scottsdale, AZ, Nov. 1998.

ITU-R BT.2100-0 "Image Parameter Values for High Dynamic Range Television for Use in Production and International Programme Exchange" Jul. 2016.

SMPTE ST 2084:2014 "High Dynamic Range Electro-optical Transfer Function of Mastering Reference Displays" Aug. 16, 2014.

* cited by examiner

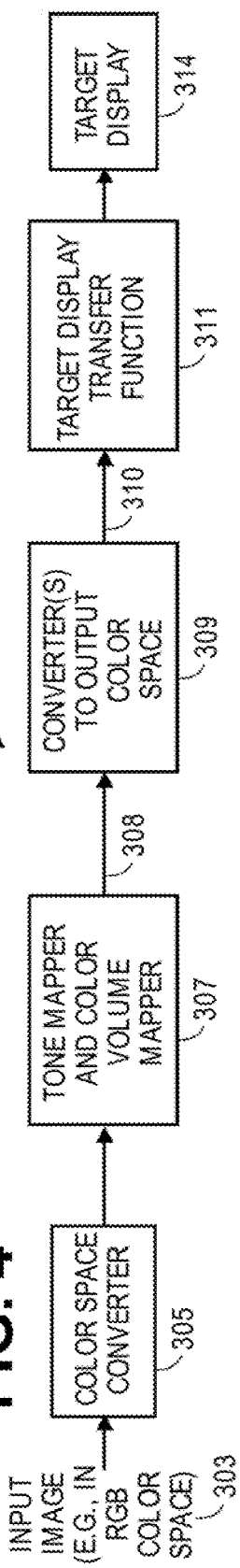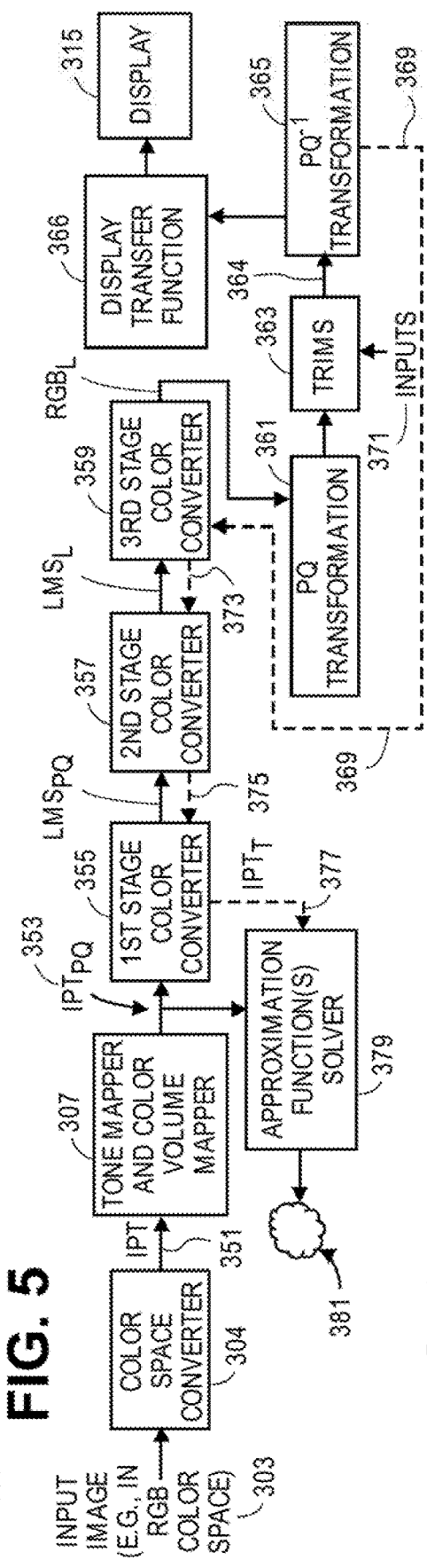

COLOR IMAGE MODIFICATION WITH APPROXIMATION FUNCTION

CROSS REFERENCE TO RELATED APPLICATIONS

This application claims priority to U.S. Provisional Patent Application No. 62/466,963, filed on Mar. 3, 2017, and European Patent Application No. 17159216.5 filed on Mar. 3, 2017, the disclosures all of which are incorporated herein by reference in their entirety.

BACKGROUND

An image processing pipeline (IPP) commonly refers to a sequence of operations applied to an image, and the pipeline can start at the image source (e.g., a camera) and end at the image renderer (e.g., a television). The image data often undergoes manipulations which require one or more non-linear conversions between spaces. FIG. 1A shows an example of an image processing pipeline which includes such a conversion. In the pipeline of FIG. 1A, an input 10 containing image data in a general intermediate color space (denoted as color space ABC) is provided as an input to the converter 12 which uses a non-linear function $H_0$ to convert image data in the ABC color space to image data 14 in another color space, denoted as color space JKL, which can be an RGB-type color space. The image data 14 can be further processed (e.g., in operations 16), resulting in an input 19 (in the RGB linear light color space—$RGB_L$) that is provided to a transfer function 21 which is the electro-optical transfer function (EOTF) of the target display. The TEOTF (Target Electro-Optical Transfer Function) 21 produces an output 23 that can drive the target display. The non-linear function $H_0$ and potentially other functions not shown (in operations 16), such as perceptual quantization (PQ) functions, can be very complex non-linear functions.

As used herein "IPT color space" refers to a Luma (I)-Chroma (P and T)-like space (like YCbCr). The original IPT space was described in "Development and testing of a color space (ipt) with improved hue uniformity", by F. Ebner and M. D. Fairchild, in Proc. 6th Color Imaging Conference: Color Science, Systems, and Applications, IS&T, Scottsdale, Ariz., November 1998, pp. 8-13 (to be referred to as the Ebner paper), which is incorporated herein by reference in its entirety. More recently, the final non-linearity in the Ebner paper was replaced by a perceptual quantizer (PQ) that better matches the properties of the human visual system. The PQ quantizer is described in U.S. Pat. No. 9,077,994, by J. S. Miller et al., which is incorporated herein by reference in its entirety, parts of which have been adopted by the SMPTE ST 2084:2014 specification, titled "High Dynamic Range Electro-optical Transfer Function of Mastering Reference Displays," Aug. 16, 2014, incorporated herein by reference in its entirety. In certain embodiments, IPT may refer to the ICtCp color space defined in the ITU-R Rec. BT. 2100-0 (July 2016), "Image parameter values for high dynamic range television for use in production and international programme exchange," which is incorporated herein by reference in its entirety. Like YCbCr, ICtCp is a color-opponent based encoding scheme intended to separate luma from chroma information. In addition, ICtCp offers constant intensity (CI) representation.

BRIEF DESCRIPTION OF THE DRAWINGS

The present invention is illustrated by way of example and not limitation in the figures of the accompanying drawings in which like references indicate similar elements.

FIG. 4 shows an example of a display management system that can support images that have high dynamic range and wide color gamut.

FIG. 5 shows an example of a display management system that includes back projection to obtain trimmed image data in a first color space (e.g., an IPT-type color space) from trimmed image data in a second color space (e.g., an RGB-type color space).

FIG. 6 shows an example of a display management system that uses a set of approximation functions according to one embodiment described herein.

DESCRIPTION OF EXAMPLE EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein relate to the use of one or more approximation functions, created from one or more back projections of trimmed image data from a downstream point in an image processing pipeline to an upstream point in the pipeline. The trimmed image data can be created by a colorist at the downstream point, and then the approximation function(s) can be derived (e.g., through back projection and regression) and then provided to a display management system on one or more target display systems. The approximation function(s) can be used to match between two sets of data or variables that are related by one or more complicated non-linear transfer or transformation functions.

Figure 1A:
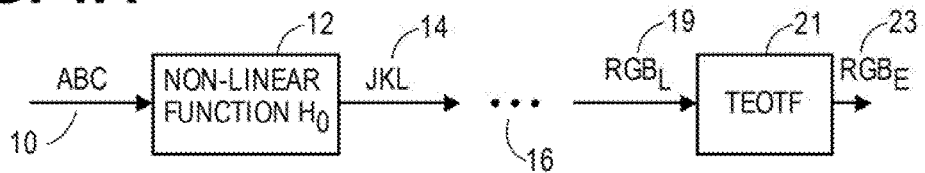
FIG. 1A shows an example of an image processing pipeline which includes a non-linear function.
Figure 1B:
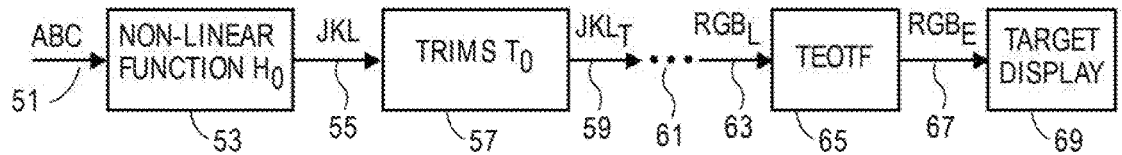
FIG. 1B shows an example of an image processing pipeline which includes a unit or component that trims (e.g., adjusts) the image data in the JKL color space.

Color grading or color correction generally refers to the process of manipulating image content to enhance image quality on a target display. Various color grading tools such as six-vector grading, a Color Decision List (CDL) as defined by the American Society of Cinematographers (ASC), and others are available for use by colorists, and the choice of a specific tool or method can depend on the desired results. Color correction is usually applied in the RGB or HSV color spaces which are more intuitive due to human perception of color in these spaces. FIG. 1B shows an example of an image processing pipeline that uses color correction, referred to as "trims" (in the case of the CDL defined by ASC), in a common color space that is used to make color corrections, such as RGB or HSV. Input image data 51 can be in a general intermediate color space, denoted as ABC, which can in one embodiment be an IPT-type color space. The input image data 51 is converted, by non-linear function $H_0$, from image data in the ABC color space to image data 55 in the JKL color space. In FIG. 1B, JKL represents one of the common color spaces in which color correction trims are usually applied (e.g., RGB color space for ASC-CDL grading or HSV color space for six-vector grading). In trim unit 57, one or more color trims $T_0$ are applied to the image data 55 to create trimmed image data 59 in the JKL color space (labeled as $JKL_T$). The trimmed image data 59 can be further processed (e.g., in operations 61), resulting in an input 63 (in the RGB linear light color space) that is provided to the target display's EOTF 65. The target display's EOTF 65 provides an output 67 that drives the target display 69 to cause the target display 69 to display images (e.g., a movie or television show or video game, etc.) on the screen of the target display. In the case of the pipeline in FIG. 1B, the trim is deferred until the image data is in the JKL color space, but deferring trims to some point near the target display can require expensive hardware (at a display management system of the target display) to implement the trims. The one or more embodiments described herein provide a solution that does not defer the trim in this way.

Figure 2:
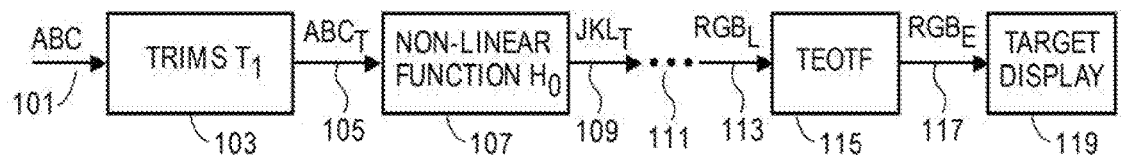
FIG. 2 shows an architecture of an image processing pipeline in which color trims are applied to image data in the ABC color space.

FIG. 2 shows an example of an architecture of an image processing pipeline in which the color trims $T_1$ are performed in the ABC color space (on image data 101) before the image data is converted into image data in the JKL color space by the color space converter 107 (which uses the non-linear function $H_0$ to convert the $ABC_T$ image data). In particular, image data 101 in the ABC color space is adjusted with color trims $T_1$ in the trim unit 103 which produces trimmed image data 105 ($ABC_T$) in the ABC color space. This trimmed image data 105 is then converted into trimmed image data 109 ($JKL_T$) by the color space converter 107. The trimmed image data 109 can be further processed (e.g., in operations 111), resulting in an input 113 (in the RGB linear light-$RGB_L$ color space) that is provided to the target display's EOTF 115. The output from the target display's EOTF 115 drives the target display 119 using the input 117 (in $RGB_E$) to the target display 119. One advantage of the architecture of the pipeline in FIG. 2 is that it may avoid expensive hardware modifications to display management systems that drive target displays but still provide for the use of existing color grading techniques such as the CDL as defined by the ASC. The embodiments described herein enable the functionality of the pipeline shown in FIG. 2 and use the projection of color trims $T_0$ (in FIG. 1B) into color trims $T_1$.

Figure 3A:
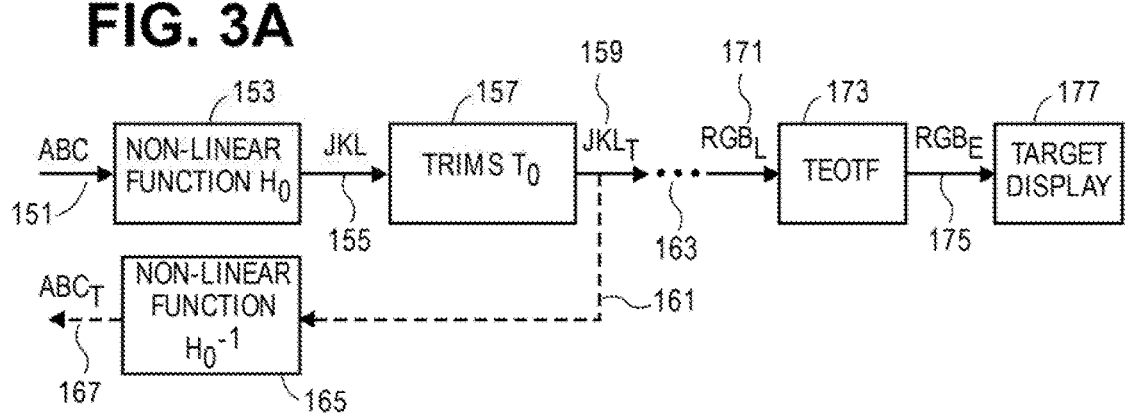
FIG. 3A shows an example of an image processing pipeline that uses back projection to obtain trimmed image data in the ABC color space from trimmed image data in the JKL color space.

FIG. 3A shows a general example of this projection in a display management system; in one embodiment, this projection can be performed on a colorist's system that creates the color trims, and this projection can be referred to as a back projection. Referring to FIG. 3A, image data 151 in the ABC color space is converted, by color space converter 153, into image data 155 in the JKL color space. Then, color trims $T_0$ are applied to image data 155 by the trim unit 157 to produce trimmed image data 159 ($JKL_T$) in the JKL color space. This trimmed image data 159 can be further processed in operations 163 to derive image data 171 (in $RGB_L$ color space) which is transformed by the target display's EOTF to create image data 175 that drives the target display 177. The output of the image on the target display 177 allows a colorist (or other user) to view the image on the target display 177 and decide whether the image has been properly or correctly trimmed (adjusted), and the colorist can interactively change the trims to see the resulting change in the image on the target display 177. Once the colorist is satisfied with the trims $T_0$, the trimmed image data 159 ($JKL_T$) can be back projected, through back projection 161, by feeding the trimmed image data 159 as an input to a function $H_0^{-1}$ which is an inverse function of the function $H_0$; the inverse function $H_0^{-1}$ in converter 165 produces trimmed image data ($ABC_T$) 167 in the ABC color space based upon the trimmed image data 159 ($JKL_T$) in the JKL color space. In effect, the converter 165 produces a result that can be represented by the equation: $ABC_T = H_0^{-1}(J_T, K_T, L_T)$. The trim unit 157 is bypassed by the back projection 161 as shown in FIG. 3A. At this point, the display management system in FIG. 3A has a set of $ABC_T$ values (image data in ABC color space) and a corresponding set of ABC values (original image data in ABC color space) that are related through one or more non-linear transfer functions. The back projection 161 in one embodiment maps the image data between the color spaces. The non-linear relationship between the set of $ABC_T$ values and the set of ABC values can be mathematically expressed as:

$$A_T = f_A(A, B, C, \{t_1, \ldots, t_n\}_J),$$

$$B_T = f_B(A, B, C, \{t_1, \ldots, t_n\}_K),$$

$$C_T = f_C(A, B, C, \{t_1, \ldots, t_n\}_L),$$

where $t_1, \ldots, t_n$ can be the trims in the ASC-CDL color correction format (including, for example, trim values for slope, offset, and power (S, O, P)).

In one embodiment, an approximation method such as linear regression, neural network training, or support vector machine can be used to generate a function such as a linear approximation function (e.g., $F_A$, $F_B$, $F_C$) that fits a model or approximation function to the two sets of data. In one embodiment, the approximation functions can be represented as linear functions:

$$A_T = F_A(A, B, C, \{t_1, \ldots, t_n\}_J),$$

$$B_T = F_B(A, B, C, \{t_1, \ldots, t_n\}_K),$$

$$C_T = F_C(A, B, C, \{t_1, \ldots, t_n\}_L),$$

Figure 3B:
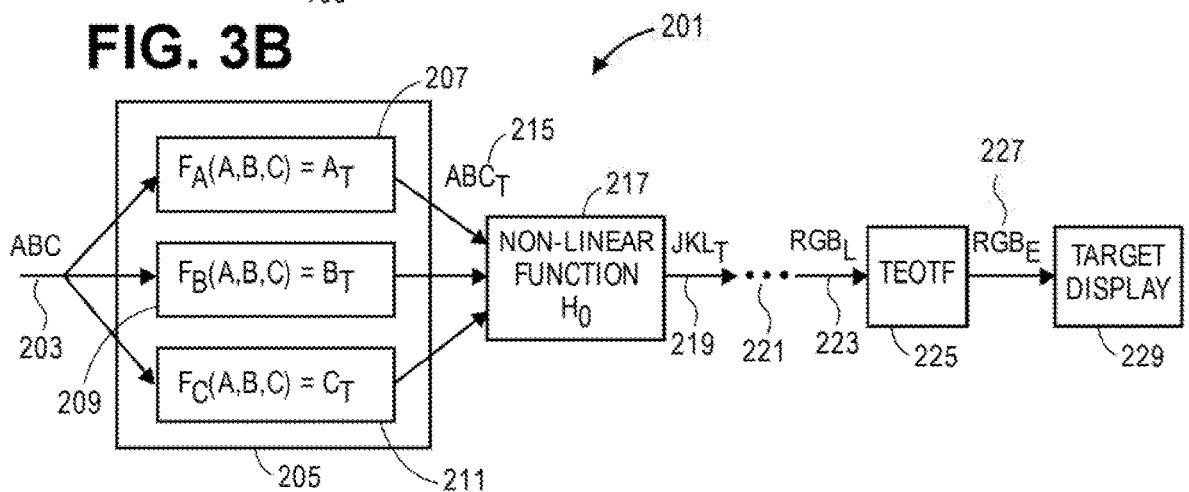
FIG. 3B shows a generalized example of a display management system that uses one or more approximation functions to create trimmed image data.

These approximation functions $F_A$, $F_B$, and $F_C$ can be derived from the two sets of image data (ABC and $ABC_T$) on the colorist's system, and the derived functions (or metadata such as coefficients in the functions) can be saved and then transmitted or otherwise distributed to one or more display management systems that drive target displays, and these display management systems (at target displays) can use the derived functions to implement the pipeline shown in FIG. 3B, which resembles the pipeline shown in FIG. 2 in that the color trims are applied before the conversion between ABC and JKL color spaces. The system configuration (pipeline 201) shown in FIG. 3B produces the same output image as the pipeline shown in FIG. 1B.

As shown in FIG. 3B, image data 203 in the ABC color space is provided as an input to three approximation functions 207, 209, and 211 within the approximation unit 205; the approximation function 207 computes the trimmed output AT for the A coordinate, the approximation function 209 computes the trimmed output BT for the B coordinate, and the approximation function 211 computes the trimmed output CT for the C coordinate. The trim values selected by the colorist for the image, in one embodiment, are represented by coefficients in each of the approximation functions. Thus, a first set of coefficients in this embodiment specifies a color trim for a first set of one or more images, and the three approximation functions 207, 209, and 211 use this first set of coefficients to complete the trimmed image data ($ABC_T$) 215 for the first set of images; a second set of coefficients specifies a color trim for a second set of one or more images, and the three approximation functions 207, 209, and 211 use this second set of coefficients to compute the trimmed image data 215 for the second set of images. The trimmed image data 215 is provided as an input to the non-linear function $H_O$ in color space converter 217 which converts the $ABC_T$ image data in the ABC color space into trimmed image data 219 ($JKL_T$) in the JKL color space. The trimmed image data 219 ($JKL_T$) can then be further processed (e.g., in operation 221), resulting in image data 223 (in an $RGB_L$ color space) that is applied as an input to the target display's EOTF 225. The target display's EOTF 225 applies the EOTF for the target display 229 to display one or more images in the content. The pipeline 201 can reduce a need to modify hardware in the display management system while providing a way to use color trims which in effect were derived from color trims applied in the JKL color space. FIGS. 3A and 3B show generalized examples of one or more embodiments of the invention while FIGS. 5 and 6 show a more specific example. Prior to describing FIGS. 5 and 6, some information about the architecture of the pipelines in FIGS. 5 and 6 will be provided in conjunction with FIG. 4.

The image processing pipeline 301 in FIG. 4 is an example of a display management system that drives a target display that may have the capability of displaying high dynamic range images and also display images with a wide color gamut. The display management system can be designed to receive image data created with a high quality (e.g., "reference") source display and map the image data so that it can properly be displayed on a target display that may not be capable of the full dynamic range or color gamut of the reference display. In one embodiment, the pipeline 301 can be part of a display management system which supports Dolby Vision technology from Dolby Laboratories, and this technology can permit the distribution of high dynamic range and wide color gamut content, based on reference systems that can create such content, to target systems that have smaller dynamic ranges or smaller color gamuts while retaining high quality images. Further information about such technology can be found in published US Patent Application No. US 2016/0005349 which is incorporated herein by reference. As shown in FIG. 4, the pipeline 301 can include a color space converter 305, a tone mapper and color volume mapper 307, a set of one or more converters 309 to convert the mapped image data from the maps 307 into an output color space, a target display transfer function 311, and a target display 314 that is driven by the image data in the output from the target display transfer function. The color space converter 305 receives image data 303 representing one or more images. In one embodiment, the image data 303 can be an RGB-type color space, and the converter 305 can convert that image data 303 into image data in an IPT-type color space (e.g., IPT or ICtCp color spaces) which is then mapped in the mapper 307. The tone mapper, in one embodiment, in the mapper 307 can map intensity (or luminance like) values, such as the I values in image data from converter 305 in the IPT-type color spaces, in the input image data (which can have the high dynamic range of the source display) to intensity (or luminance like) values in the dynamic range of the target display (which may be a smaller dynamic range relative to the source display). The color volume mapper in the mapper 307 can, in one embodiment, perform color volume mapping from the input image data (which can have the wide color gamut of the source display) to image data in the color gamut of the target display 314. The output 308 from the mapper 307 can be provided as an input to one or more color space converters 309 which convert the mapped image data in the output 308 to the output space of the target display 314; the output 310 from the one or more color space converters 309 is transformed by the target display transfer function 311 to derive an output that drives the target display 314. The pipeline 301 can also include other components used in Dolby Vision, such as a detail preservation unit that restores high frequency details in the intensity channel that may be lost due to tone mapping.

FIG. 5 shows a specific example of a pipeline that is similar to pipeline 301 but is used by a colorist (or other user) to generate approximation functions (or data, such as coefficients, to generate the approximation functions); thus, the pipeline in FIG. 5 can include some of the same components as the pipeline 301 but includes a target display 315 which can be a reference display used by a colorist to view adjusted (trimmed) images and select one or more color trims using the trim unit 363. The pipeline in FIG. 5 can, in one embodiment, be part of a Dolby Grading Tool from Dolby Laboratories. The color space converter 304 in FIG. 5 receives the image data 303, which can be in an RGB-type color space, and converts that image data 303 into image data 351 which can be in an IPT-type color space. The image data 351 is then tone mapped and color volume mapped by mapper 307 in FIG. 5, which can be the same as mapper 307 in FIG. 4. The mapper 307 in FIG. 5 provides mapped image data 353 (in an $IPT_{PQ}$ color space in that the IPT image data has undergone a perceptual quantization transformation). This mapped image data 353 is then transformed through a series of three color space conversions (by color space converters 355, 357, and 359) into image data in the $LMS_{PQ}$ color space and then into image data in the LMS linear light color space and finally into an RGB linear light space at the output of color converter 359. A traditional colorist system would normally output the RGB linear image data, through the target display transfer function 366, to the target display 315. However, the pipeline in FIG. 5 has been modified by the addition of three blocks (PQ transformation 361, trims unit 363, and $PQ^{-1}$ transformation 365) that allow the colorist to generate trims far downstream (near the target display) and then back project those generated trims back to trimmed image data in the IPT color space at the end of back projection path 377. Thus, the modifications by these three blocks in effect creates trims like trims $T_0$ in FIG. 1B and then back projects the trimmed image data (using reverse or inverse transformations along the back projection paths 369, 373, 375, and 377) to derive trimmed image data ($IPT_T$) in the IPT color space. This trimmed image data ($IPT_T$) is then used with the mapped image data 353 to derive the approximation functions such as the approximation functions shown in trim unit 405.

The PQ transformation 361 performs a perceptual quantization (PQ) transformation (e.g., such as a PQ transformation method described in the Recommendation ITU-R BT.2100-0 from the International Telecommunication Union) on the image data (in the RGB linear light color space) that is provided as an output from converter 359 to produce image data in an RGB PQ color space that is provided to the trims unit 363. The trims unit 363 can then modify the image data based on color trims, where the color trims can be based on inputs 371 which can be inputs from a colorist who is viewing the results of the color trims on the target display 315; the colorist, in one embodiment, can interactively change the inputs 371 to see the results of the change displayed on the target display 315 in order to decide which color trims to select. The trimmed image data 364 modified by the trips unit 363 is provided as an output from trims unit 363 to the inverse PQ ($PQ^{-1}$) transformation 365 which performs an inverse PQ transformation on the trimmed image data 364 (in the RGB PQ color space) to produce an output of trimmed image data (in RGB linear light color space) which is then processed by the target display transfer function 366 to yield a set of image data (e.g., a frame of image data) that drives the source display 315. The inverse PQ transformation 365 also provides an output that is the beginning of the back projection path 369. The back projection paths include a set of inverse transformations which convert the trimmed image data (from the output of inverse PQ transformation 365) into image data in the LMS linear color space (after an RGB linear to LMS linear conversion in converter 359) and then convert the trimmed image data into image data in the LMS PQ color space and then convert the trimmed image data into image data in the IPT PQ color space to produce the output $IPT_T$ at the end of back projection path 377. It can be seen that the trims unit 363 is similar to trims unit 157 in FIG. 3A in that the color trims selected by a user (e.g. a colorist controlling inputs 371) result in trimmed image data that is back projected to derive a set of data (e.g. $ABC_T$ or $IPT_T$) that can be used with another set of data for the same image (e.g., ABC or IPT) to create a set of approximation functions that can be used on a target display's display management system to trim the image on the target display.

The approximation function(s) solver 379 generates one or more approximation functions (e.g., the approximation functions used in trim unit 405) which fit the two sets of data (mapped image data 353 ($IPT_{PQ}$) and $IPT_T$ data at the end of the back projection path 377) to a mode (e.g., one or more equations) that represents the non-linear relationship between the two sets of data. The approximation function solver 379 can use any one of a variety of techniques to perform the fit of the two sets of data to a model; for example, the solver 379 can use linear regression (e.g., multivariate linear regression) or neural network training or support vector machine or other techniques known in the art to fit or match two sets of data to the model used by the solver 379 to generate the approximation functions, such as the approximation functions in trim unit 405 in FIG. 6. The approximation function(s) solver 379 provides output 381 which can include a full description of the approximation functions, such as one or more equations and a set of coefficients that is used in the equations, or the output 381 can include just the coefficients for a known model or set of equations used by trim units (e.g., trim unit 405) in display management systems. In one embodiment, the approximation function(s) solver uses a linear model to express the following three functions:

$$I_T = F_I(I, P, T, \{S, O, P_n\}_R),\qquad\text{(Equation 1)}$$

$$P_T = F_P(I, P, T, \{S, O, P_n\}_G),\qquad\text{(Equation 2)}$$

$$T_T = F_T(I, P, T, \{S, O, P_n\}_B),\qquad\text{(Equation 2)}$$

wherein IPT are represented by the mapped image data 353 ($IPT_{PQ}$), and $I_T$ is represented by the image data in the I channel in $IPT_T$ at the end of back projection 377, $P_T$ is represented by the image data in the P channel in $IPT_T$ at the end of back projection 377, and $T_T$ is represented by the image data in the T channel in $IPT_T$ at the end of back projection 377. Note that each one of the data components in $IPT_T$ ($I_T$, $P_T$, $T_T$) is a function of the components I, P, and T and also the S, O, P (Slope, Offset, and Power) trim values based on the CDL as defined by the ASC. The trim values can be selected by the inputs 371 which can be controlled by the colorist using the pipeline shown in FIG. 5. In one embodiment, a multivariate linear regression is used to determine three mathematical models (one for each of $F_I$, $F_P$, and $F_T$) to express each of the $IPT_T$ data components ($I_T$, $P_T$, $T_T$) as functions of I, P, T (represented by mapped image data 353) and the SOP trim values. In one embodiment, a third order linear regression model:

$$\begin{aligned}F(I, P, T) = &\, a_0 + a_1 I + a_2 P + a_3 T + a_4 IP + a_5 IT + a_6 PT - a_7 \\&\, IP^2 + a_8 I^2 P - a_9 IT^2 + a_{10} I^2 T + a_{11} PT^2 - a_{12} P^2 T + a_{13} \\&\, I^2 - a_{14} I^3 - a_{15} P^2 - a_{16} P^3 + a_{17} T^2 + a_{18} T^3 - a_{19} IPT\end{aligned}\qquad\text{(Equation 4)}$$

is used for each of the three functions in equations 1-3. The 20 coefficients ($a_0, \ldots, a_{19}$) depend on the SOP trims and are provided, in one embodiment, per image frame as metadata along with the image data of the frame; in other words, the SOP trims are embedded in the 20 coefficients because the regression fitted the IPT and $IPT_T$ data sets for a single given set of SOP trims (specified by inputs 371). Thus, the solver 379 can, in one embodiment, generate the set of 20 coefficients for use with the model in Equation 4 for each of the equations 1-3 and provide this set of coefficients as an output 381 (for the associated image) for distribution (along with the image data) to one or more display management systems that drive target displays. Display management systems which receive these coefficients can then derive the set of approximation functions such as the approximation functions in trim unit 405.

FIG. 6 shows an example of such a display management system, in one embodiment, which receives image data and metadata in the form of the coefficients (e.g., 20 coefficients) used to generate the approximation functions in trim unit 405. The display management system shown in FIG. 6 can, in one embodiment, be a system which supports the Dolby Vision technology from Dolby Laboratories, and thus it is similar to the image processing pipeline 301 shown in FIG. 4. In particular, the color space converter 401 can be similar to the color space converter 305, and the tone mapper and color volume mapper 403 can be similar to the tone mapper and color volume mapper 307. In one embodiment, the display management system shown in FIG. 6 receives image data 303 which represents one or more images; in one embodiment, the image data can be in the RGB color space, and the converter 401 converts the image data in the RGB color space into image data in the IPT color space. Then, the tone mapper and color volume mapper 403 can perform tone mapping and color volume mapping operations as described herein, such as the operations described relative to the mapper 307 in FIG. 4. The mapper 403 produces mapped image data in the IPT color space which is then provided as an input to the three approximation functions shown in the trim unit 405, which produces trimmed IPT values for each pixel in the image based upon the trims specified inherently in the coefficients used in the equations of the approximation functions within the trim unit 405. In one embodiment, the display management system shown in FIG. 6 receives the image data along with metadata describing the color trims, and this metadata can be the 20 coefficients determined by the approximation function solver 379 on a colorist's system in one embodiment. In one embodiment, the metadata can apply to one or more images that have been trimmed by the colorist, and another set of images can use a different set of color trims specified by another set of different metadata. In another embodiment, the metadata may be a full description of a set of one or more approximation functions; this may be used in situations in which the model or approximation functions can change as may be desirable depending upon image content or availability of different hardware, etc. In other words, it may be desirable to change the models or approximation functions in trim unit 405, and thus trim unit 405 in this case does not use a static, predetermined set of approximation functions or models. The trimmed image data from trim unit 405 is provided as an output to a set of one or more color converters, such as color converters 409, which can be the same as the first, second, and third stage color converters in FIG. 5. The color converters 409 produce, in one embodiment, an output of image data in the RGB linear light color space which is applied as an input to the target display transfer function 411 which produces image data as an input to the target display 415 which then displays the image on the target display 415.

Figure 7:
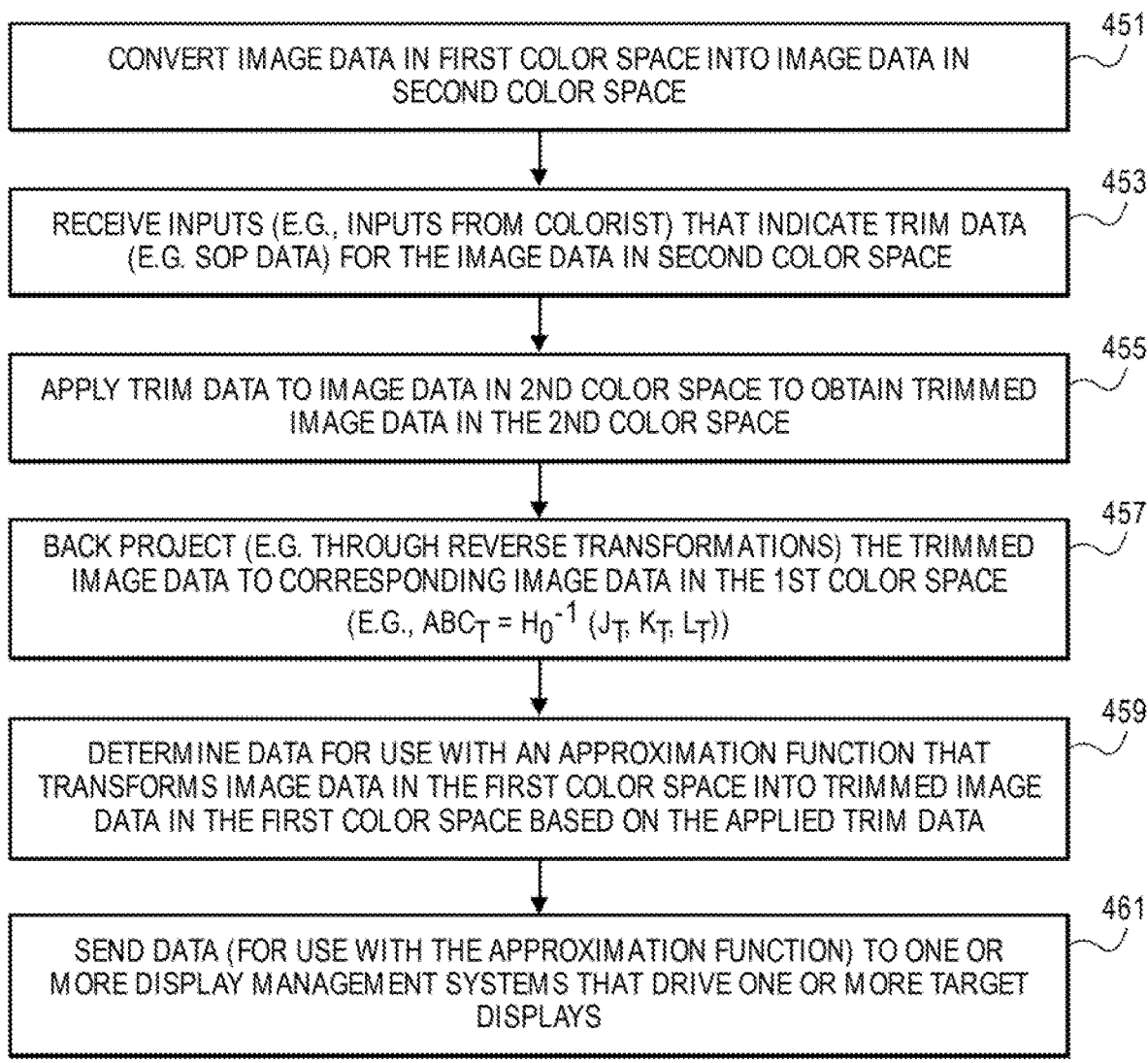
FIG. 7 is a flowchart that shows a method according to one or more embodiments of the invention.

FIG. 7 shows an example of a method according to one embodiment of the invention, and this method can be performed on a system such as that shown in FIG. 3A or the system shown in FIG. 5, which systems can be operated by a colorist or other user who is causing color trims to be generated. The method shown in FIG. 7 can begin in operation 451, and this operation can include converting image data in a first color space into image data in a second color space. In one embodiment, operation 451 can be performed by color space converter 153 which transforms image data in the ABC color space into image data in the JKL color space. In the case of the system shown in FIG. 5, operation 451 may be performed by a set of color converters such as the color converters 355, 357, and 359. In one embodiment, operation 451 may be preceded by other operations, such as a color space conversion operation (e.g., a conversion done by color space converter 304) and may also be preceded by mapping operations, such as a tone mapping and a color volume mapping operation by, for example, the mapper 307. Continuing with the method of FIG. 7, in operation 453, the system receives inputs that indicate trim data for the image data in the second color space. The inputs may be inputs from a colorist or other user who is viewing a target display, such as target display 315. The trim data, in one embodiment, can be the SOP data described herein. Then in operation 455, the system can apply the trim data to the image data in the second color space to obtain trimmed image data in the second color space. In one embodiment, this trimmed image data in the second color space can be the output from the inverse PQ transformation 365 which provides an input to the back projection path 369 as shown in FIG. 5. Then in operation 457, the trimmed image data is back projected through, for example, reverse transformations, to corresponding image data in the first color space. In the case of the example shown in FIG. 5, this trimmed image data in the first color space is the input provided by the end of the back projection path 377 shown in FIG. 5. Then in operation 459, processing logic such as, for example, the approximation function solver 379 shown in FIG. 5, determines data for use with a set of approximation functions that transform image data in the first color space into trimmed image data in the first color space based on the applied trim data. Then in operation 461, the data which was determined in operation 459 can be distributed to one or more display management systems that drive one or more target displays. For example, metadata describing a set of coefficients for the approximation functions can be distributed along with the image data to a display management system, such as the display management system shown in FIG. 6.

Figure 8:
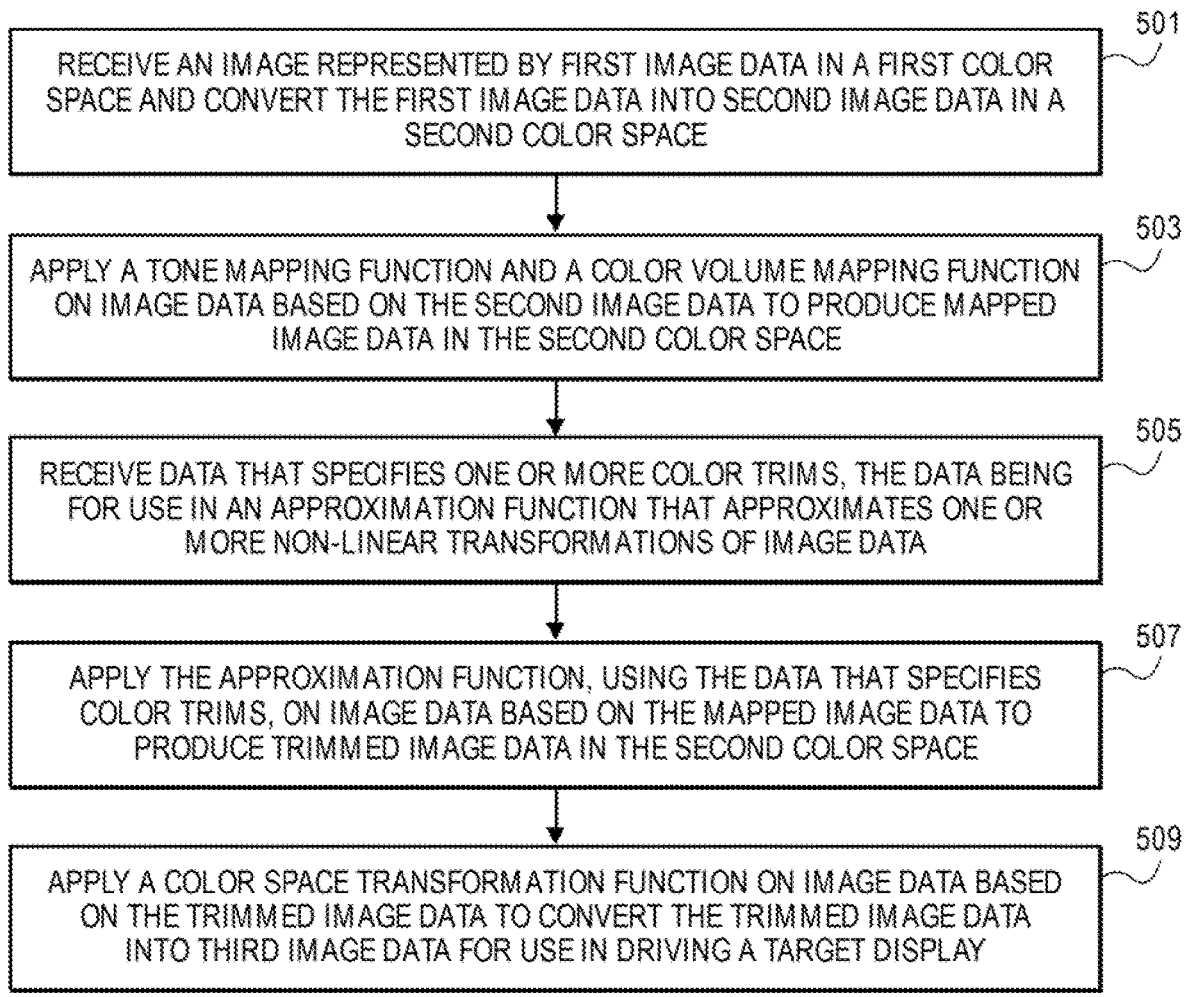
FIG. 8 is a flowchart that shows another method according to one or more embodiments of the invention.

FIG. 8 shows an example of a method according to one embodiment of the invention which can be performed by a display management system that drives a target display, such as the display management system shown in FIG. 3B or the display management system shown in FIG. 6. In operation 501, first image data representing an image is received and converted from first image data in a first color space into second image data in a second color space. In one embodiment, the color space converter 401 can perform operation 501. Then in operation 503, a tone mapping function and a color volume mapping function are applied to image data based on the second image data to produce mapped image data in the second color space. In one embodiment, the mapper 403 can perform operation 503 to produce the mapped image data in the second color space. In operation 505, the system can receive data that specifies one or more color trims, and this data can be used in one or more approximation functions that approximates one or more non-linear transformations of the image data. In one embodiment, this data can be a set of coefficients that is used in the approximation functions, such as the approximation functions shown in the trim unit 405 in FIG. 6. Then in operation 507, the approximation function is used on the image data with the data that specifies the color trims to produce trimmed image data in the second color space. The result, in one embodiment, of operation 507 is the output of the trimmed image data in the second color space from the trim unit 405 shown in FIG. 6. Then in operation 509, one or more color space transformation functions are applied on the image data to convert the trimmed image data into third image data for use in driving a target display. In one embodiment, the set of converters 409 shown in FIG. 6 can perform operation 509 to provide image data for use in driving a target display through a target display transfer function, such as the target display transfer function 411 shown in FIG. 6. In an alternative embodiment, operations 501 and 503 can be optional, such as the embodiment shown in FIG. 3B which does not include the color space conversion of operation 501 and does not include the tone mapping function and the color volume mapping function.

Figure 9:
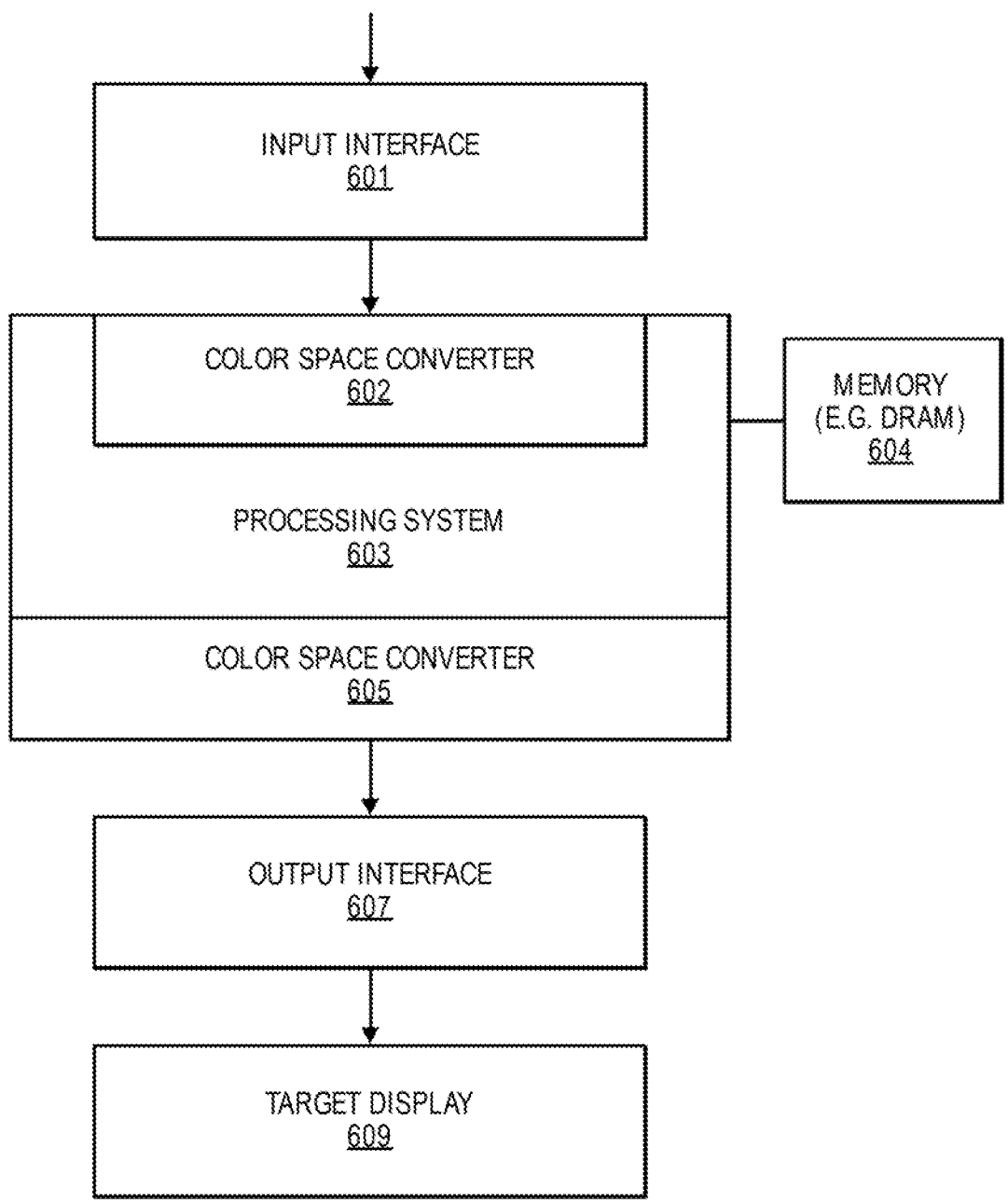
FIG. 9 shows an example of a display management system according to one or more embodiments described herein.

FIG. 9 shows an example of components of a display management system, such as the display management system shown in FIG. 6. This example in FIG. 9 typically includes hardware processing systems, such as either general purpose processor(s) or some special purpose processor(s) or both, and memory and input and output interfaces. The general purpose processor(s), if present, can be programmable by software instructions which execute on the one or more general purpose processors. The special purpose processors, if present, may also be configured by software or hardware logic to perform operations, such as color space conversions or other processing operations. The input interface 601 can be a network interface, such as an Ethernet or WiFi interface or a cable TV interface or a satellite TV interface, and the input interface 601 receives, in one embodiment, the input image represented by image data 303 shown in FIG. 6. This input can then be provided to the color space converter 602, which in one embodiment can be the color space converter 401. The color space converter 602 can be implemented in either general purpose programmable hardware or special purpose hardware configured to perform color space conversions (or a combination of both) and contained within the processing system 603, which is coupled to memory 604. The memory 604 can store images and metadata, such as metadata describing the color trims (e.g., coefficients in the approximation functions). In one embodiment, the color space converter 602 can perform the color space transformation in operation 501 of FIG. 8. The processing system 603 can perform, in one embodiment, the tone mapping operations and the color volume mapping operations as well as perform the color trims by using the set of approximation functions, such as the approximation functions shown in the color trim unit 405 in FIG. 6. The color space converter 605 can then convert the image data that has been trimmed based upon the approximation functions into an output color space to drive the target display 609 through an output interface 607. The output interface 607 can be a hardware interface, such as an HDMI interface or other known display interfaces which are coupled to the target display 609, which can be the same as the target display 415 shown in FIG. 6.

Figure 10:
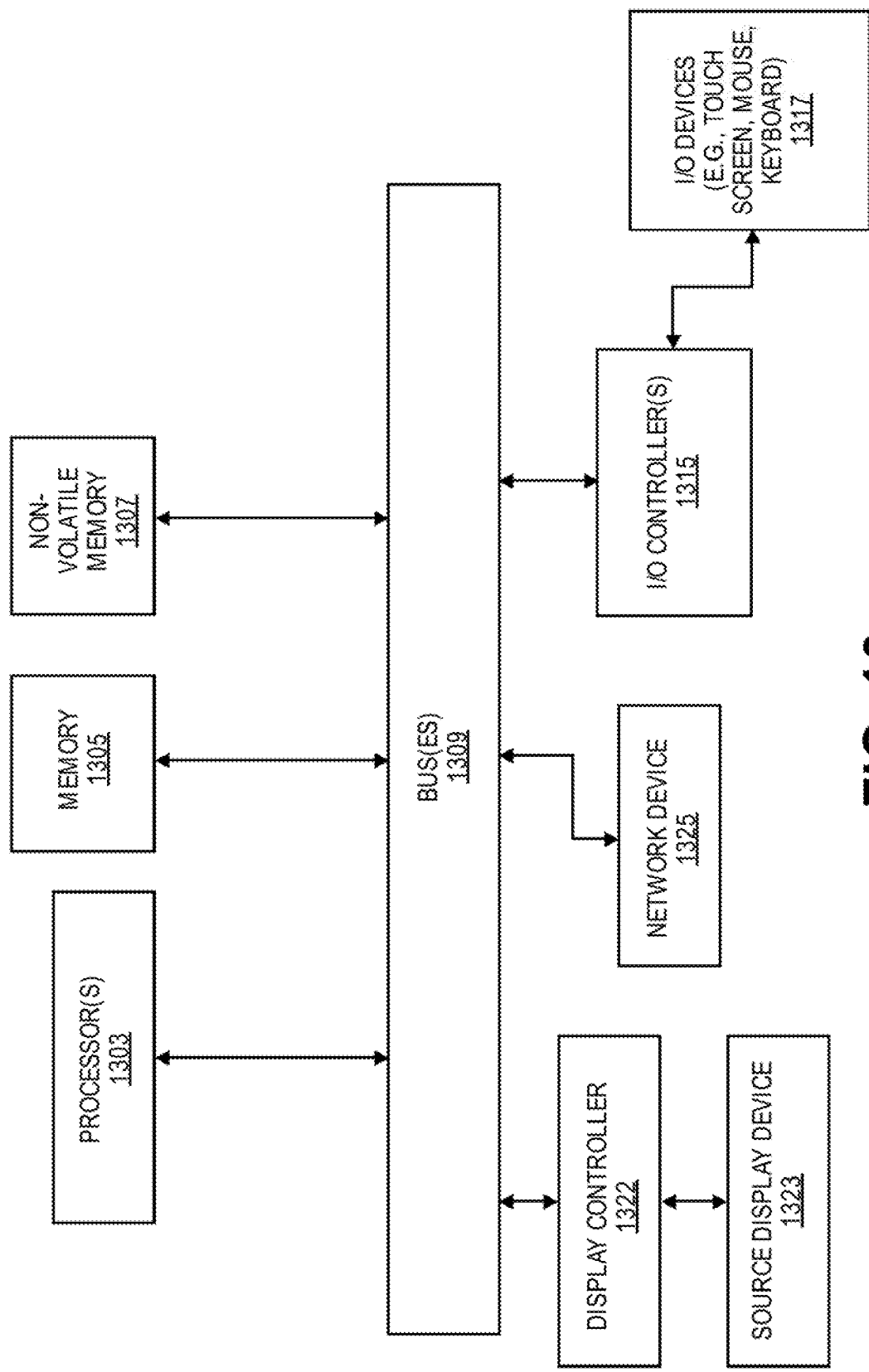
FIG. 10 shows an example of a data processing system which can be used by a colorist to create color trims.

FIG. 10 shows an example of a data processing system that can be used by a colorist. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include desktop computers, laptop computers, tablet computers, embedded electronic devices, or other electronic devices.

FIG. 10 is a block diagram of data processing system hardware according to an embodiment. Note that while FIG. 10 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 10 can also be used with one or more embodiments of the present invention.

As shown in FIG. 10, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a source display device 1323. The source display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The colorist can use the one or more input devices to adjust color trims for one or more images. The input/output devices 1317 are coupled through one or more I/O controllers 1315 as is known in the art.

While FIG. 10 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth) that receive images from a camera, etc.

It will be apparent from this description that one or more embodiments of the present invention may be embodied, at least in part, in software. That is, the techniques may be carried out in a data processing system in response to its one or more processor(s) executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Various aspects of the present invention may be appreciated from the following enumerated example embodiments (EEEs):

EEE 1. A method for processing one or more images, the method comprising:
  receiving an image represented by first image data in a first color space;
  converting the first image data in the first color space into second image data in a second color space;
  applying a tone mapping function and a color volume mapping function on image data based on the second image data in the second color space to produce mapped image data in the second color space;

receiving data that specifies one or more color trims, the data for use in an approximation function that approximates one or more non-linear transformations of image data;

applying the approximation function, using the data that specifies one or more color trims, on image data based on the mapped image data to produce trimmed image data in the second color space;

applying a color space transformation function on image data based on the trimmed image data to convert the trimmed image data into third image data in a third color space.

EEE 2. The method of EEE 1, the method further comprising:

displaying the image using image data derived from the third image data.

EEE 3. The method of any preceding EEE, wherein the data represents coefficients in the approximation function and the approximation function is a linear approximation function.

EEE 4. The method of any preceding EEE, wherein the second color space is an IPT-type color space and the first color space and the third color space are an RGB-type color space.

EEE 5. The method of any preceding EEE, wherein the data that specifies one or more color trims was created by performing a color trim in the third color space and then back projecting the result of the color trim to produce trimmed IPT image data.

EEE 6. The method of EEE 5, wherein the linear approximation function is derived through a multivariate linear regression which uses the trimmed IPT image data and corresponding IPT data for the image to produce the linear approximation function.

EEE 7. The method of any preceding EEE, wherein the tone mapping function maps image data from a high dynamic range used on a source display to a lower dynamic range used on the target display and wherein the color volume mapping function maps image data from a large color gamut on the source display to a smaller color gamut on the target display.

EEE 8. A non-transitory machine readable medium storing instructions which when executed by a display management system cause the system to perform a method as in any one of EEEs 1-7.

EEE 9. A display management system which includes a memory and a processing system configured to perform a method as in any one of EEEs 1-7.

EEE 10. A method for processing one or more images, the method comprising:

receiving an image represented by first image data in a first color space;

applying a first color space transformation function on the first image data to convert the first image data into second image data in a second color space;

receiving one or more user inputs that define color trim data;

applying at least one of a tone mapping function or a color volume mapping function on image data based on the second image data in the second color space to produce mapped image data in the second color space;

applying a second color space transformation on image data based on the mapped image data in the second color space to convert the mapped image data into third image data in a third color space;

applying the color trim data on image data derived from the third image data to produce first trimmed image data in the third color space;

projecting back image data based on the first trimmed image data back to the second color space to produce second trimmed image data in the second color space;

determining trim approximation data for use in an approximation function that approximates one or more non-linear transformations of image data, the trim approximation data based on the second trimmed image data and the image data based on the mapped image data;

storing or transmitting data representing the trim approximation data for use by one or more display management systems.

EEE 11. The method of EEE 10, the method further comprising:

displaying on a display an image using image data based on the first trimmed data in the third color space.

EEE 12. The method of any one of EEEs 10 to 11, wherein the first color space is an RGB-type color space, the second color space is an IPT-type color space, and the third color space is an RGB-type color space.

EEE 13. The method of any one of EEEs 10 to 12, wherein the one or more user inputs is from a colorist who is viewing the display.

EEE 14. The method of any one of EEEs 10 to 13, wherein the tone mapping function maps image data from a high dynamic range used on a source display to a lower dynamic range used on the display and wherein the color volume mapping function maps image data from a large color gamut on the source display to a smaller color gamut on the display.

EEE 15. The method of any one of EEEs 10 to 14, wherein the trim approximation data represents coefficients in the approximation function and the approximation function is a linear approximation function.

EEE 16. The method of any one of EEEs 10 to 15, wherein determining the trim approximation data involves using multivariate regression to derive the coefficients in the approximation function.

EEE 17. The method of EEE 14, wherein projecting back involves using reverse transformations to reverse the sequence of transformations between the mapped image data and the second trimmed image data.

EEE 18. The method of EEE 15, wherein the projecting backs occur in response to a user input by a user after viewing the display.

EEE 19. A non-transitory machine readable medium storing instructions which when executed by a data processing system cause the data processing system to perform a method as in any one of EEEs 10-18.

EEE 20. A data processing system comprising a memory and a processing system coupled to the memory, the processing system configured to perform a method as in any one of EEEs 10-18.

What is claimed is:

1. A method for determining coefficients of one or more color correction approximation functions prior to use by one or more target display management systems, the method comprising:

receiving an image represented by first image data in a first color space;

applying a first color space transformation function on the first image data to convert the first image data into second image data in a second color space;

receiving one or more user inputs that define color correction data to be applied in a third color space that is preferred for making color corrections;

applying at least one of a tone mapping function or a color volume mapping function on the second image data in the second color space to produce mapped image data in the second color space;

applying a second color space transformation on the mapped image data in the second color space to convert the mapped image data into third image data in the third color space;

applying the color correction data on the third image data in the third color space to produce first color corrected image data in the third color space;

projecting back the first color corrected image data in the third color space to the second color space to produce second color corrected image data in the second color space, wherein projecting back involves using reverse transformations to reverse the sequence of transformations between the mapped image data in the second color space and the second color corrected image data in the second color space;

determining coefficients of the one or more color correction approximation functions by an approximation function solver, wherein the one or more color correction approximation functions are configured to fit the mapped image data in the second color space and the back-projected second color corrected image data in the second color space to a mode that represents the non-linear relationship between the mapped image data in the second color space and the back-projected second color corrected image data in the second color space, and wherein the approximation function solver is configured to determine the coefficients of the one or more color correction approximation functions such that the one or more color correction approximation functions, when configured with the generated coefficients and applied to the mapped image data in the second color space, approximate the color correction performed on the third image data in the third color space; and storing or transmitting the coefficients of the one or more color correction approximation functions for use by the one or more target display management systems.

2. The method of claim 1, the method further comprising: displaying on a reference display an image using image data based on the first color corrected image data in the third color space.

3. The method of claim 2, wherein the one or more user inputs is from a colorist who is viewing the reference display.

4. The method of claim 1, wherein the first color space is an RGB-type color space, the second color space is an IPT-type color space, and the third color space is an RGB-type or HSV-type color space.

5. The method of claim 1, wherein the tone mapping function maps image data from a high dynamic range used on a source display to a lower dynamic range used on a reference display and wherein the color volume mapping function maps image data from a large color gamut on the source display to a smaller color gamut on the reference display.

6. The method of claim 1, wherein at least one of the one or more color correction approximation functions is a linear approximation function and wherein determining the coefficients of the one or more color correction approximation functions involves using multivariate regression to derive the coefficients.

7. The method of claim 1, wherein the projecting back occurs in response to a user input after viewing an image based on the first color corrected image data.

8. A data processing system comprising a memory and a processing system coupled to the memory, the processing system configured to perform a method as recited in claim 1.

9. A non-transitory machine readable medium storing instructions which when executed by a data processing system cause the data processing system to perform a method as recited in claim 1.

* * * * *